United States Patent
Liu et al.

(10) Patent No.: US 7,426,176 B2
(45) Date of Patent: Sep. 16, 2008

(54) METHOD OF POWER ALLOCATION AND RATE CONTROL IN OFDMA SYSTEMS

(75) Inventors: Jung-Tao Liu, Randolph, NJ (US); Hsuan-Jung Su, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1055 days.

(21) Appl. No.: 10/261,293

(22) Filed: Sep. 30, 2002

(65) Prior Publication Data

US 2004/0062192 A1  Apr. 1, 2004

(51) Int. Cl.
*H04J 11/00* (2006.01)
*H04J 1/16* (2006.01)
*H04Q 7/00* (2006.01)

(52) U.S. Cl. .......... 370/206; 370/252; 370/332

(58) Field of Classification Search .......... None
See application file for complete search history.

(56) References Cited

U.S. PATENT DOCUMENTS

| | | | | |
|---|---|---|---|---|
| 5,636,247 | A | 6/1997 | Kamerman et al. | 375/260 |
| 6,259,319 | B1 | 7/2001 | Ghanadan et al. | 330/149 |
| 6,347,071 | B1 | 2/2002 | Cupo et al. | 370/203 |
| 6,353,637 | B1 | 3/2002 | Mansour et al. | 375/260 |
| 6,393,276 | B1 * | 5/2002 | Vanghi | 455/422.1 |
| 6,430,401 | B1 | 8/2002 | Lou et al. | 455/108 |
| 6,445,693 | B1 | 9/2002 | Sarraf et al. | 370/343 |
| 6,677,864 | B2 * | 1/2004 | Khayrallah | 341/50 |
| 6,873,831 | B2 * | 3/2005 | Attar et al. | 455/127.2 |
| 7,035,201 | B2 * | 4/2006 | Fu et al. | 370/208 |
| 7,099,299 | B2 * | 8/2006 | Liang et al. | 370/342 |
| 7,245,598 | B2 * | 7/2007 | Puig-Oses et al. | 370/334 |
| 2001/0038630 | A1 | 11/2001 | Tong et al. | 370/395 |

FOREIGN PATENT DOCUMENTS

| | | |
|---|---|---|
| EP | 1 204 217 A1 | 5/2002 |
| WO | WO 99/13675 | 3/1999 |

OTHER PUBLICATIONS

Pending U.S. Appl. No. 10/266,285, filed Oct. 8, 2002 (Liu 7).
European Search Report.

* cited by examiner

*Primary Examiner*—Chi H. Pham
*Assistant Examiner*—Soon D. Hyun

(57) ABSTRACT

A method of data communication. The method includes initially receiving one or more channel quality information signals from each wireless unit. The channel quality information may be received in response to the transmission of one or more pilot signals. Once the channel quality information signal(s) from each wireless unit are received, the method then includes selecting one or more transmit powers and one or more transmission rates for each wireless unit. Thereafter, one or more blocks of orthogonal continuous waveforms may be transmitted over a channel to each wireless unit using the selected transmit power and selected transmission rate.

19 Claims, 2 Drawing Sheets

METHOD OF POWER ALLOCATION AND RATE CONTROL IN OFDMA SYSTEMS

BACKGROUND OF THE INVENTION

I. Field of the Invention

The present invention relates to telecommunications, and more particularly to power allocation and rate control.

II. Description of the Related Art

Wireless communications systems employ a number of geographically distributed, cellular communication sites or base stations. Each base station supports the transmission and reception of communication signals to and from stationary or fixed, wireless communication devices or units. Each base station handles communications over a particular region commonly referred to as a cell/sector. The overall coverage area for a wireless communications system is defined by the union of cells for the deployed base stations. Here, the coverage areas for adjacent or nearby cell sites may overlap one another to ensure, where possible, contiguous communications coverage within the outer boundaries of the system.

When active, a wireless unit receives signals from at least one base station over a forward link or downlink and transmits signals to at least one base station over a reverse link or uplink. Several approaches have been developed for defining links or channels in a cellular communication system, including, for example, TDMA (time-division multiple access), and CDMA (code-division multiple access).

In TDMA communication systems, the radio spectrum is divided into time slots. Each time slow allows only one user to transmit and/or receive. Thusly, TDMA requires precise timing between the transmitter and receiver so that each user may transmit their information during their allocated time.

In CDMA communications systems, different wireless channels are distinguished by different channelization codes or sequences. These distinct channelization codes are used to encode different information streams, which may then be modulated at one or more different carrier frequencies for simultaneous transmission. A receiver may recover a particular stream from a received signal using the appropriate code or sequence to decode the received signal.

For voice applications, conventional cellular communication systems employ dedicated links between a wireless unit and a base station. Voice communications are delay-intolerant by nature. Consequently, wireless units in wireless cellular communication systems transmit and receive signals over one or more dedicated links. Here, each active wireless unit generally requires the assignment of a dedicated link on the downlink, as well as a dedicated link on the uplink.

With the explosion of the Internet and the increasing demand for data, resource management has become a growing issue in cellular communication systems. Next generation wireless communication systems, such as those employing High Speed Downlink Packet Access ("HSDPA"), are expected to provide high rate packet data services in support of Internet access and multimedia communication. Unlike voice, however, data communications may be potentially bursty yet relatively delay tolerant. Data communications, as such, may not require dedicated links on the downlink or the uplink, but rather enable one or more channels to be shared by a number of wireless units. By this arrangement, each of the wireless units on the uplink competes for available resources. Resources to be managed in the uplink include the received power at the base station, and the interference created by each user to other users in the same sector or cell, as well as in other sectors or cells, for example.

Various implementations have been examined for HSDPA systems. One such scheme is orthogonal frequency-division multiple access ("OFDMA"). In OFDMA implemented HSDPA systems, a carrier signal may be defined by a number (e.g., 1024) of sub-carriers or tones transmitted using at set of mathematically time orthogonal continuous waveforms. One example of a set of orthogonal waveforms is the set of sinusoids with frequencies that are integer multiples of a fixed positive value. The orthogonality of the tones allows for their transmission and/or reception, while preventing them from interfere with one another. A number of neighboring tones may be grouped together to form a block of tones such that each user may be assigned one or more blocks of tones. Each tone experiences flat fading with respect to the other tones, and thusly, the equalization demands in the transmission and/or reception of the block of tones may be substantially reduced.

In HSDPA systems, the base station may need to manage its resources on the downlink. These base station resources include transmit power budget. OFDMA may support a simplified implementation for managing a base station's transmit power budget. In an optimized HSDPA system employing OFDMA, the transmit power budget may be uniformly allocated. Here, the transmit power allocated to each wireless unit requesting HSDPA service in an identical manner.

Once the transmit power has been allocated, the base station controls the rate of transmission for each wireless unit. In an OFDMA implemented HSDPA system, this process may involve transmitting one or more pilot signals to each wireless unit. After receiving the pilot signal(s), each wireless unit transmits a signal containing channel condition information to the base station. The channel in which the block(s) of tones are transmitted on the downlink is characterized here by this signal, more commonly referred to as channel quality information ("CQI"). More particularly, a single CQI is transmitted to the base station irrespective of the number of blocks of tones a wireless unit may have designated thereto. The base station, in response to receiving a CQI from each wireless unit, controls rate of transmission for the relevant wireless units. The number of blocks designated to a user may be reflective of the data demands of the user and the capacity of the system.

OFDMA implemented HSDPA systems have not, to date, been optimized. As a single CQI is transmitted without regard to the number of blocks of tones the wireless unit has assigned, one issue of significance is fading. One wireless unit may receive a number of blocks, each of which may fade at differing degrees. Consequently, the single CQI may not reflect changes in the channel condition over the course of time in which the numbers of blocks are transmitted on the downlink. This diminishes the gain that may be achieved by managing the base station's transmit power budget.

As a result of the hereinabove, a demand exists for a method that managing the transmit power budget and the transmission control rate of a base station. Moreover, a need exists for a method of optimizing a base station's resources for an OFDMA implemented HSDPA system.

SUMMARY OF THE INVENTION

The present invention provides a method for managing the resources of a base station. More particularly, the present invention provides a method for adjusting the transmit power budget and transmission control rate of a base station. The method of the present invention may be applied to HSDPA systems, including those that are implemented using OFDMA.

In an embodiment of the present invention, a base station receives at least one CQI from each wireless unit. As a result, the base station selects a transmit power level for each wireless unit in response to each unit's CQI. The base station may also consider the available transmit power budget, while selecting the transmit power level for each wireless unit. Once the transmit power level for each wireless unit has been selected, the method designates a transmission rate for each wireless unit in response to the CQI for each unit.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

Figure 1:
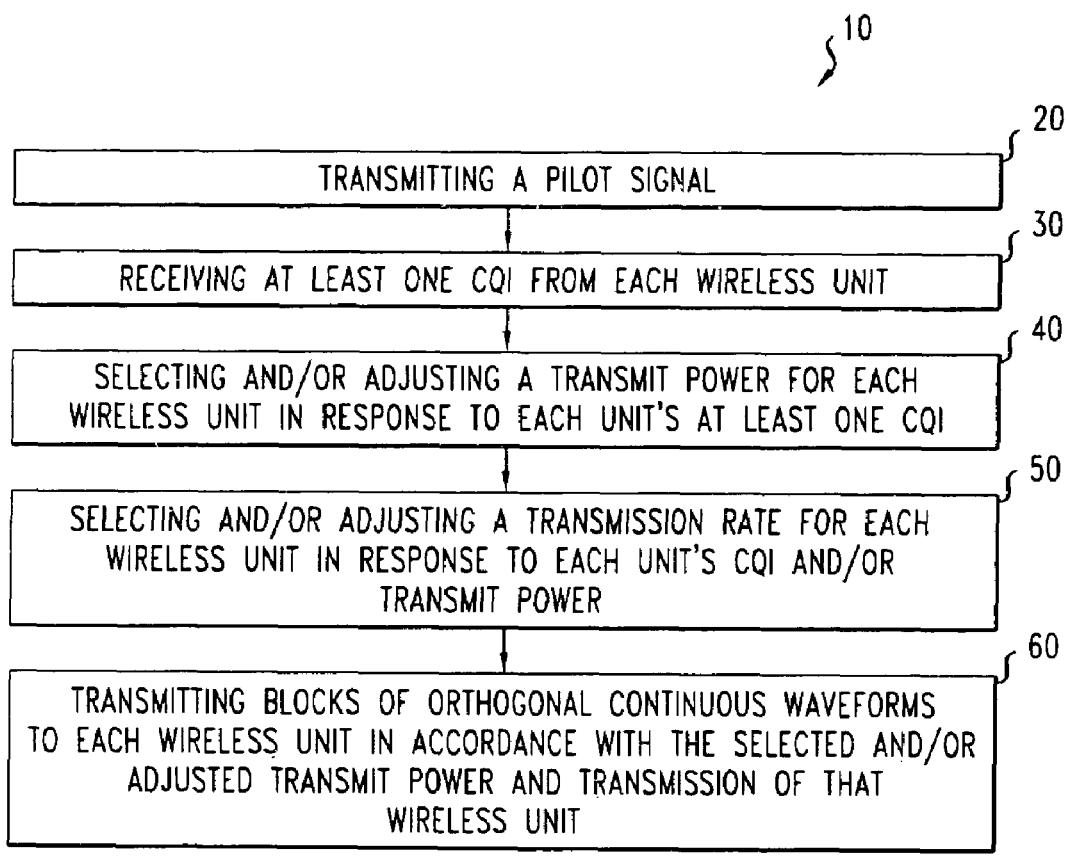
FIG. 1 depicts an embodiment of the present invention.

Referring to FIG. 1, a flow chart depicting one embodiment of the present invention is illustrated. More particularly, a method (10) is depicted for managing the resources of a base station offering data services, such as HSDPA. For the purposes of the present disclosure, the resources of a base station may include the transmit power budget and transmission rate control on the downlink.

A wireless communication system offering HSDPA services may be implemented by a number of schemes, including OFDMA. In selecting an OFDMA implementation, the channels for conveying data from the base station to each wireless unit may be defined by any one of a number of multiple access schemes, including code division, time division, and/or frequency division, for example. Therefore, multi-code transmission, code division multiplexing and link adaptation may be employed in conjunction with HSDPA.

In accordance with the method (10) of the present embodiment, initially the base station of the wireless communication system generates one or more pilot signals (20). The generated pilot signal(s) are transmitted to a number of wireless units. The pilot signal(s) may be transmitted after any number of protocol exchanges between the base station and wireless unit. Consequently, the base station may have already determined after transmitting the pilot signal(s) which wireless unit(s) is seeking to acquire access to its HSDPA services.

Once the one or more pilot signals are transmitted by the base station (20), at least one channel quality information ("CQI") signal is transmitted by each wireless unit (30). In one example of the method (10), the CQI signal(s) may be transmitted in response to the pilot signal(s). The CQI signal(s) is received by the base station and provides the characteristics of the channel. The CQI signal(s) from each wireless unit define the various attributes of the channel over which data may be transmitted on the downlink. These attributes include the attenuation pattern viewed by the specific wireless unit.

With the one or more CQI signals received from each wireless unit, the base station may then allocate its resources. As noted above, these resources include transmit power and transmit rate control, for example. Consequently, the base station may select a transmit power for each wireless unit from which it receives a CQI signal(s) (40). This step may be performed at the onset of a downlink data transmission. In this circumstance, the method (10) selects the transmit power for a wireless unit prior to the first downlink of data from the base station. Alternatively, it may be executed in the midst of data transmission over the downlink.

This step of allocating the transmit power from a base station's budget may be executed in accordance with any number of prioritization or scheduling schemes. Here, the pool of received CQI signals are evaluated and ranked. By this arrangement, a wireless unit having the lowest attenuation pattern, for example, may receive a greater portion of the transmit power budget than the remainder of the wireless units that have had their CQI signals received.

At a point in time before, simultaneously, or after the base station selects the transmit power for each wireless unit, the base station may select a transmission rate for each wireless unit (50). This selection step is performed in response to the CQI signal(s) of each wireless unit. This step may be performed at the onset of a downlink data transmission. Here, prior to the first downlink of data, the method (10) calls for determining the appropriate data transmission rate for a wireless unit in view of its CQI signal(s). Alternatively, it may be executed in the midst of data transmission over the downlink.

Once the transmit power and transmission rate have been selected for each wireless transmitting a CQI signal(s), the base station may begin transmitting data on the downlink (60). This transmission is executed over a designated channel. In the event that the HSDPA service is implemented using OFDMA, the data transmitted over the downlink channel to each user may include one or more blocks of at least two tones (e.g., sub-carriers). In practicality, each block may more likely comprise 50, 100 or 200 tones, for example.

Each tone may correspond with one or more data bits. Moreover, each tone within a block may comprise one or more time orthogonal continuous waveform(s). In view of the hereinabove, one ore more blocks of orthogonal continuous waveforms may be transmitted once the transmit power and transmission rate have been selected. The time orthogonal continuous waveforms in each block comprise one or more sinusoids having frequencies that are integer multiples of a fixed positive value. Consequently, a block of tones includes a defined number of sinusoids, which are integer multiples of each other's frequencies. These sinusoids are orthogonally aligned. To minimize the potentiality of interference, the number of sinusoids is frequently limited to a maximum of eight (8), for example.

Thusly, the transmission rate for each wireless unit in response to a CQI signal(s) may be controlled by allocating a specific number of blocks to a user. For example, a wireless unit selected to have a relatively higher transmission rate may have three (3) blocks of tones allocated thereby. In contrast, the base station may allocate only one (1) block of tones to another user that is deemed worthy of a relatively lower transmission rate.

It should be noted that an optimized power allocation for each tone might be easily calculated if the channel conditions for each tone were known at the receiver at the time of transmission. In HSDPA, each wireless unit may transmit a CQI signal(s) periodically to characterize its channel condition. IN response, the base station may take advantage of such information when performing scheduling.

In furtherance of this point, one block of tones may be defined as a fundamental unit for scheduling. A block of tones may consist of a fixed number of neighboring tones. Here, the wireless unit may be assigned one or multiple blocks of tones for a given total-transmit interference ("TTI"). However, this assignment may also depend on the amount of data stored in the buffer.

At each scheduling instance, the base station may schedule the wireless unit based on one or more selection criteria. These criteria may include, for example, the maximum C/I, round robin criteria, or proportional fairness criteria. Thereafter, the base station may compute the required transmit power for each wireless unit based on the most recent CQI signal(s).

Figure 2:
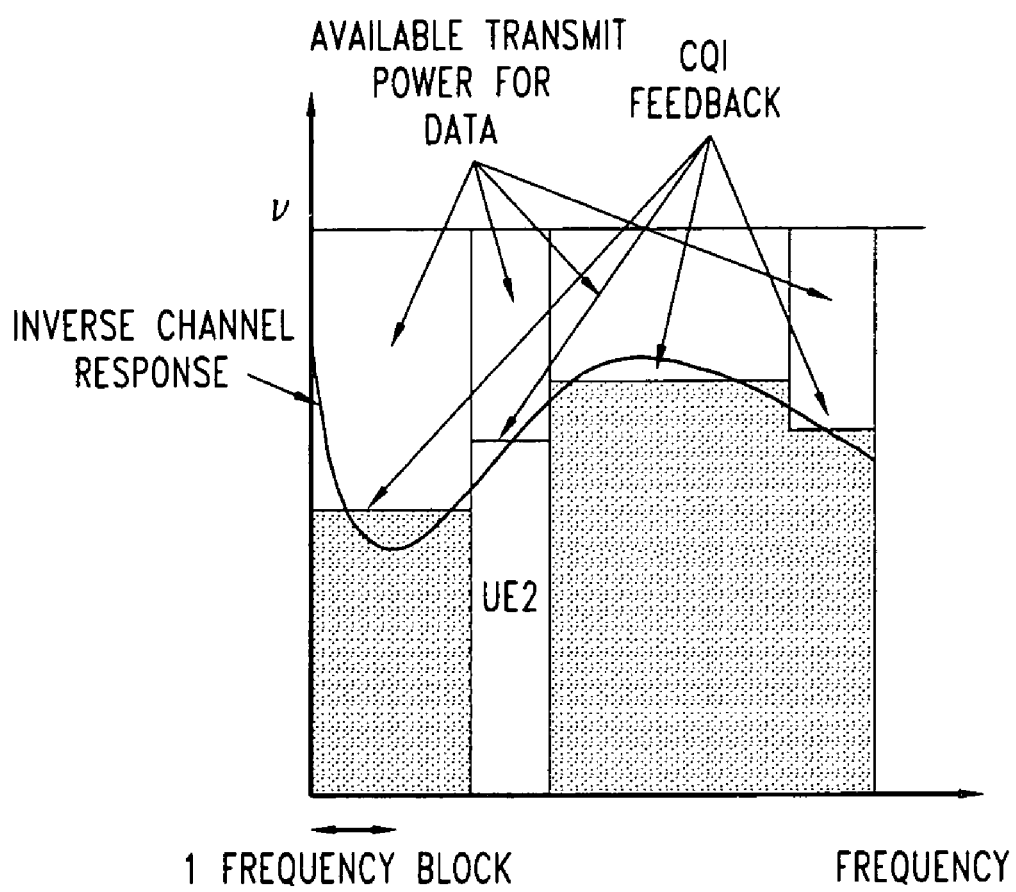
FIG. 2 depicts an exemplary aspect of the present invention

Once a power level is allocated for a wireless unit, the modulation and data rate may then be selected accordingly. Referring to FIG. 2, an example of the relationship between the total transmit power, the CQI signal, and the actual channel response is illustrated. The transmit power can be determined for the scheduled wireless units using the following mathematical equations:

$$\sum P_i = P_{total} \quad (1)$$

$$v \equiv \frac{P_{total} + \sum N_i}{\sum i} \quad (2)$$

$$P_i = v - N_i \quad (3)$$

$$N_i \approx \frac{1}{CQI_i} \quad (4)$$

where the summation is performed over all the blocks of tones, P.sub.total is the total transmit power for the data, P.sub.i is the transmit power for the i-th frequency block, v represents an estimate of the total receive power of the i-th frequency block, N.sub.i is the noise associated with the i-th frequency block, .SIGMA.N.sub.i represents an estimate of the total noise, .SIGMA.i represents the total number of frequency blocks, and CQI.sub.i represents the channel quality information value associated with the i-th frequency block.

Advantageously, transmit power allocation and transmission rate optimization may be performed jointly or simultaneously in an HSDPA system implemented using OFDMA. To realize this benefit, reception of the CQI signals from each relevant wireless unit is a necessity. Once each wireless unit compute the attenuation pattern and/or various other characteristics, a CQI signal(s) is generated and transmitted back to the base station for scheduling.

By jointly optimizing the transmit power and rate control, the likelihood that each tone may approach the capacity dictated by the channel condition and the overall downlink capacity may be maximized. Here, a base station designed for multiple access may optimize the overall downlink transmission rate and the rate for each scheduled wireless unit by scheduling one or multiple wireless units. Moreover, selecting one or multiple blocks of sub-carriers for each wireless unit within one scheduling instance in response to the CQI signals available at the time of scheduling may optimize the overall downlink transmission rate and the rate for each scheduled wireless unit.

After the transmit power for each wireless is optimized, the base station may then select the affordable data rates for each wireless unit according to the allocated power. As a result, wireless units having more attractive CQI values may be given preferential treatment. More particularly, the wireless units having more attractive CQI values may be allocated more power from the base station's resources to transmit data. In contrast, wireless units having less attractive channel conditions may be allocated less power from the base station's resources to transmit data.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as network elements, the wireless unit, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method for managing power in a communication system employing High Speed Data Packet Access (HSDPA) and including a plurality of wireless units, the method comprising:
   receiving a plurality of channel quality indicators, each channel quality indicator corresponding to a block of tones transmitted to a wireless unit, at least one wireless unit receiving at least two blocks of tones; and
   selecting at least one transmit power for transmitting at least one block of tones over a channel based on the received channel quality indicators; and
   calculating the at least one transmit power by performing a summation over each block of tones.

2. The method of claim 1, wherein the channel is defined by at least one of a code division, time division, and/or frequency division multiple access system.

3. The method of claim 1, wherein the at least one channel quality indicator signal is received in response to at least one pilot signal being transmitted.

4. The method of claim 3, wherein the at least one block comprise at least two tones, and the at least two tones comprise at least two time orthogonal continuous waveforms.

5. The method of claim 4, wherein the at least two time orthogonal continuous waveforms comprise at least two sinusoids having frequencies that are integer multiples of a fixed positive value.

6. The method of claim 5, wherein each sinusoid comprises at least one data bit.

7. The method of claim 3, wherein the at least one transmit power is selected for downlink data transmission.

8. The method of claim 7, further comprising:
   selecting at least one transmission rate based on the received channel quality indicators.

9. The method of claim 8, wherein the at least one transmission rate is selected for downlink data transmission.

10. The method of claim 9, wherein the step of selecting at least one transmit power and the step of selecting at least one transmission rate are performed jointly.

11. A method for managing the resources of a base station amongst a number of wireless units, the method comprising:

receiving a plurality of channel quality indicators, each channel quality indicator signal corresponding to a block of tones transmitted to each wireless unit, at least one wireless unit receiving at least two blocks of tones; and selecting at least one transmit power and selecting at least one transmission rate for each wireless unit based on the received channel quality indicators; and calculating the at least one transmit power by performing a summation over each block of tones.

12. The method of claim 11, wherein the step of selecting at least one transmit power and the step of selecting at least one transmission rate are performed jointly.

13. The method of claim 12, further comprising:
transmitting at least one block of orthogonal continuous waveforms over a channel to each wireless unit employing the selected transmit power and selected transmission rate.

14. The method of claim 13, wherein at least one channel quality indicator signal is received in response to at least one pilot signal being transmitted to each wireless unit.

15. The method of claim 13, wherein the channel is defined by at least one of a code division, time division, and/or frequency division multiple access system.

16. The method of claim 13, wherein the at least one block of orthogonal continuous waveforms comprises at least two sinusoids having frequencies that are integer multiples of a fixed positive value.

17. The method of claim 16, wherein each sinusoid comprises at least one data bit.

18. The method of claim 13, wherein the at least one transmit power is selected for downlink data transmission.

19. The method of claim 13, wherein the at least one transmission rate is selected for downlink data transmission.

* * * * *